US006428187B1

(12) United States Patent
Shin

(10) Patent No.: US 6,428,187 B1
(45) Date of Patent: Aug. 6, 2002

(54) VEHICLE LIGHT BEAM ADJUSTING DEVICE

(76) Inventor: Jen Hsieh Shin, 7F, No. 46, Pin Ho 10 Street, Chang Hua (TW), 500

(*) Notice: Subject to any disclaimer, the term of this patent is extended or adjusted under 35 U.S.C. 154(b) by 0 days.

(21) Appl. No.: 09/800,644

(22) Filed: Mar. 3, 2001

(51) Int. Cl.[7] .............................................. B60Q 1/076
(52) U.S. Cl. ...................................... 362/286; 362/285
(58) Field of Search ................................ 362/508, 526, 362/286, 285, 429

(56) References Cited

U.S. PATENT DOCUMENTS 1,434,404 A * 11/1922 Nordstedt .................. 362/286
1,801,864 A * 4/1931 Hutchinson ................. 362/286
3,625,528 A * 12/1971 Sage ......................... 228/2.3
5,047,902 A * 9/1991 Neumann et al. ........... 362/285
5,971,574 A * 10/1999 Taniuchi et al. ............ 362/286
6,300,718 B1 * 10/2001 Taniuchi et al. ........... 307/10.8

FOREIGN PATENT DOCUMENTS

EP 0942224 A1 * 9/1999

* cited by examiner

*Primary Examiner*—Sandra O'Shea
*Assistant Examiner*—Hargobind S. Sawhney

(57) ABSTRACT

An adjustable vehicle light device for a vehicle includes a housing secured to the vehicle, a reflector disposed in front of the housing, a light bulb slidably engaged through the bore of the reflector. A solenoid device is received in the housing and coupled to the light bulb for moving the light bulb relative to the reflector and the housing and for adjusting the light beam of the vehicle. The solenoid device includes a core slidably received in a coil and coupled to a socket of the light bulb for moving the socket and the light relative to the housing and the reflector.

1 Claim, 3 Drawing Sheets

VEHICLE LIGHT BEAM ADJUSTING DEVICE

BACKGROUND OF THE INVENTION

1. Field of the Invention

The present invention relates to a vehicle light, and more particularly to a vehicle light having a light beam adjusting device for adjusting the light beam of the vehicle.

2. Description of the Prior Art

Typical vehicle light devices, as shown in FIG. 1, includes a halogen light bulb 10 plugged to a socket 11 which includes a peripheral portion 14 having one or more catches 15 for securing to the vehicle, and which includes three prongs 16 for coupling to the electric power of the vehicle and for energizing the light bulb 10. The light bulb 10 includes two lamp wicks 12 having different lengths. The lamp wicks 12 may be energized separately or alternatively for adjusting the light beams of the vehicle. However, the light is not good enough for lighting purposes.

As shown in FIG. 2, a typical xenon light bulb 20 is illustrated and includes a single lamp wick 24 provided therein. The light bulb 20 is plugged into a socket 21 which includes one or more conductor blades 23 and which includes one or more catches 22 extended laterally or radially outward therefrom for engaging into one or more lock slots 33 of a socket 31 of a housing 30 which is secured to the vehicle. The socket 31 includes one or more openings 36 formed therein and communicating with the lock slots 33 thereof for allowing the catches 22 to be engaged into the lock slots 33, and includes a chamber 32 formed therein for receiving the socket 21, and includes one or more conductor blades 34 engaged therein for electrically coupling to the conductor blades 23 of the socket 21. The vehicle light may not be adjusted to different light beam with such xenon light bulbs.

The present invention has arisen to mitigate and/or obviate the afore-described disadvantages of the conventional vehicle light devices.

SUMMARY OF THE INVENTION

The primary objective of the present invention is to provide a vehicle light including a light beam adjusting device for adjusting the light beam of the vehicle.

In accordance with one aspect of the invention, there is provided an adjustable vehicle light device for a vehicle, the vehicle light device comprising a housing for securing to the vehicle, a reflector disposed in front of the housing and including a bore formed therein, a light bulb slidably engaged through the bore of the reflector, and means for moving the light bulb relative to the reflector to adjust a light beam of the vehicle.

The moving means includes a solenoid device received in the housing and coupled to the light bulb for moving the light bulb relative to the reflector and the housing. The solenoid device includes a coil, a core slidably received in the coil, the vehicle light device further includes a socket for plugging the light bulb, the core is coupled to the socket for moving the socket and the light relative to the housing and the reflector when the coil is energized.

The socket includes an aperture formed therein, the core includes a hook engaged into the aperture for coupling the socket to the core.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
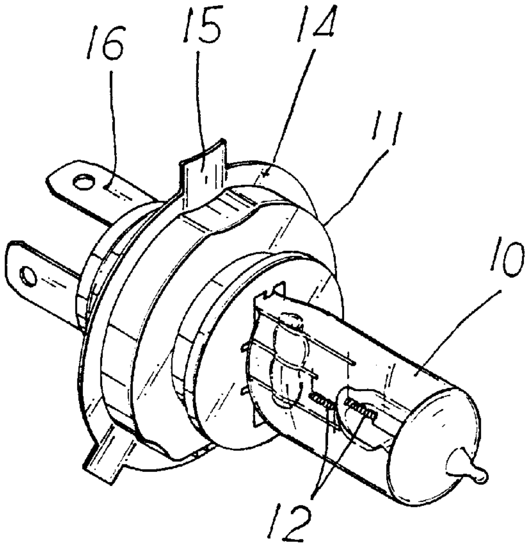
FIG. 1 PRIOR ART
FIG. 1 is a perspective view showing a typical halogen light device.
Figure 2:
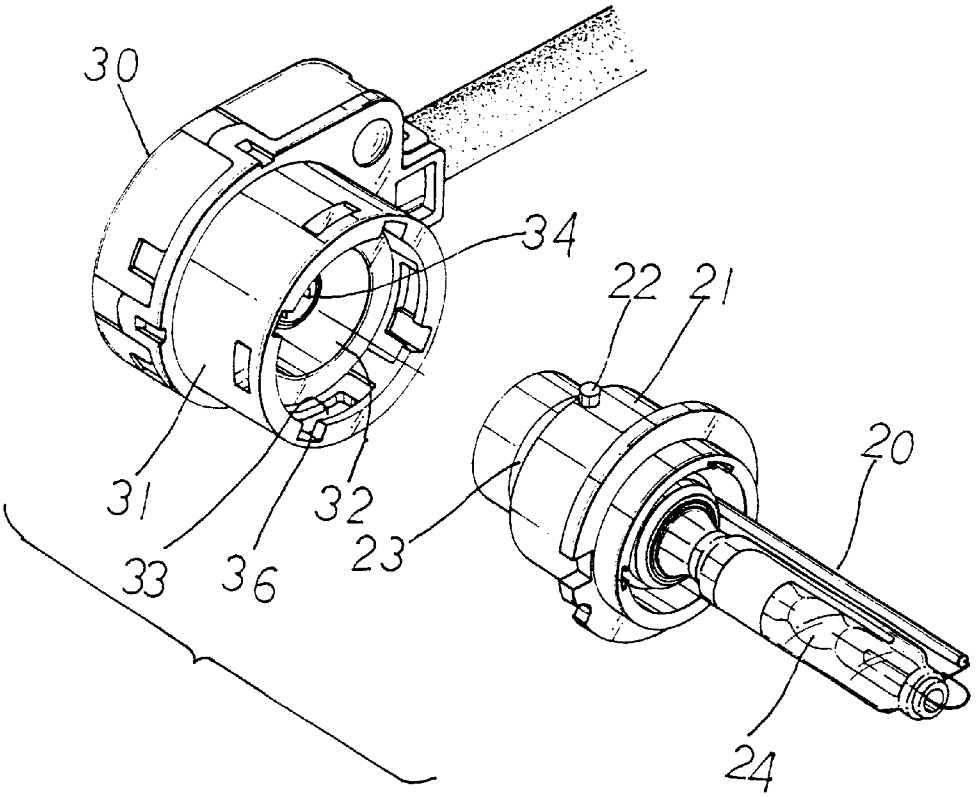
FIG. 2 PRIOR ART
FIG. 2 is a partial exploded view showing another typical vehicle light device.
Figure 3:
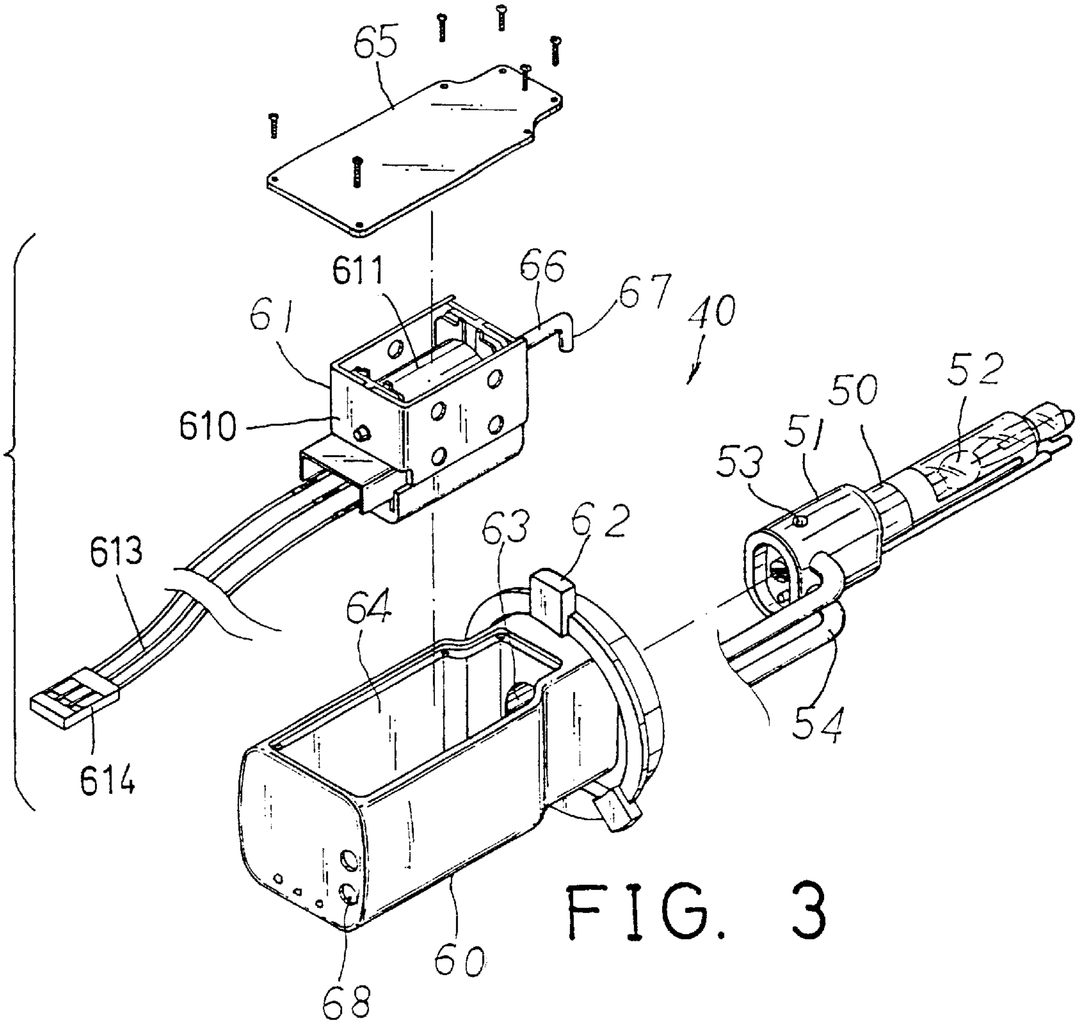
FIG. 3 is a partial exploded view showing a vehicle light in accordance with the present invention.
Figure 4:
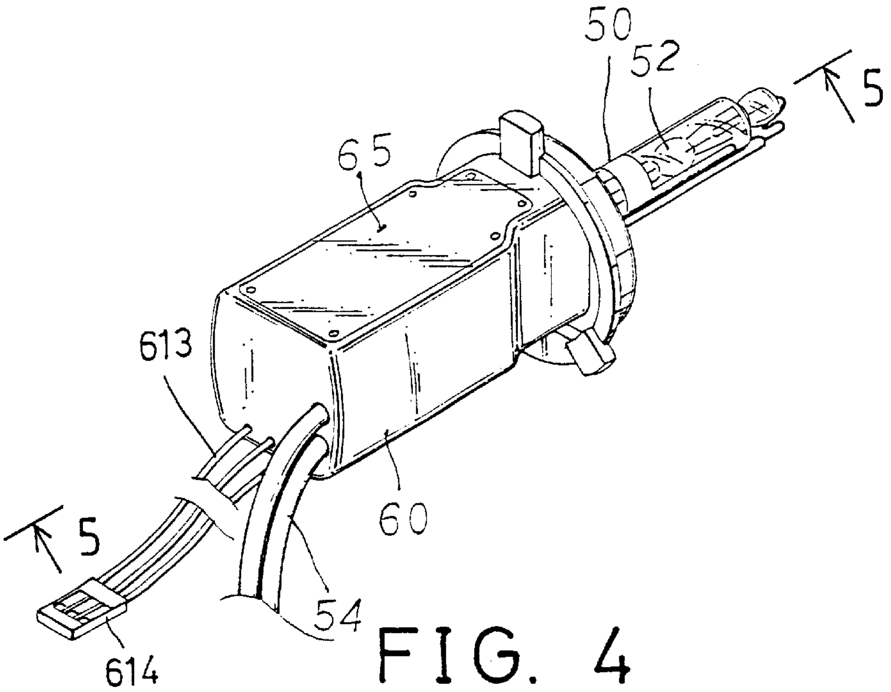
FIG. 4 is a perspective view of the vehicle light.
Figure 5:
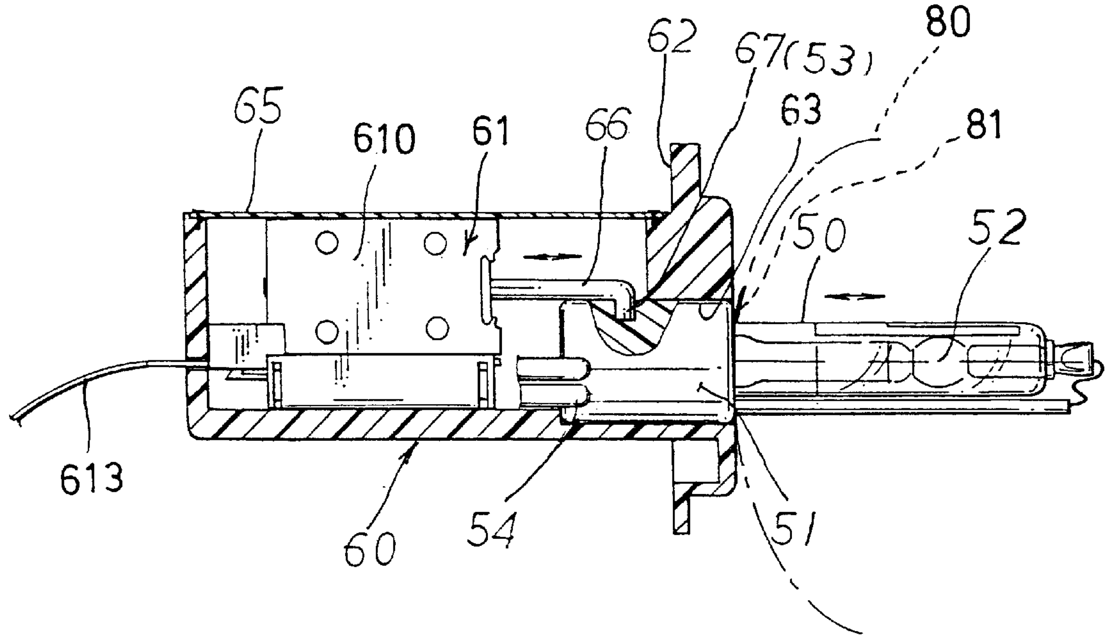
FIG. 5 is a partial cross sectional view taken along lines 5—5 of FIG. 4.

Referring to the drawings, and initially to FIGS. 3–5, a vehicle light in accordance with the present invention comprises a housing 60 including one or more catches 62 laterally or radially extended outward therefrom for securing to the vehicle, and including a chamber 64 formed therein for receiving a solenoid device 61 therein, and including an orifice 63 formed therein and communicating with the chamber 64 thereof. A cover 65 may be secured to the housing 60 for enclosing the chamber 64 of the housing 60 and for retaining the solenoid device 61 in the housing 60. The vehicle includes a reflector 80 secured to the vehicle and located in front of the housing 60.

The solenoid device 61 includes a coil 611 received in a casing 610, and includes a core 66, such as an iron core 66 slidably received in the coil 611 and having a hook 67 formed or provided on one end thereof, and includes a coupling electric wire 613 and a coupler 614 for coupling to the electric power of the vehicle. A xenon light bulb 50 is plugged to a socket 51 and slidably engaged through a bore 81 of the reflector 80, and includes one or more lamp wicks 52 provided therein. The socket 51 is slidably received in the orifice 63 of the housing 60 and includes an aperture 53 formed therein for receiving the hook 67 and for allowing the socket 51 and thus light bulb 50 to be moved relative to the housing 60 and the reflector 80 by the solenoid device 61. The socket 51 includes one or more electric wires 54 engaged through the holes 68 of the housing 60 for coupling to the electric power of the vehicle.

Figure 6:
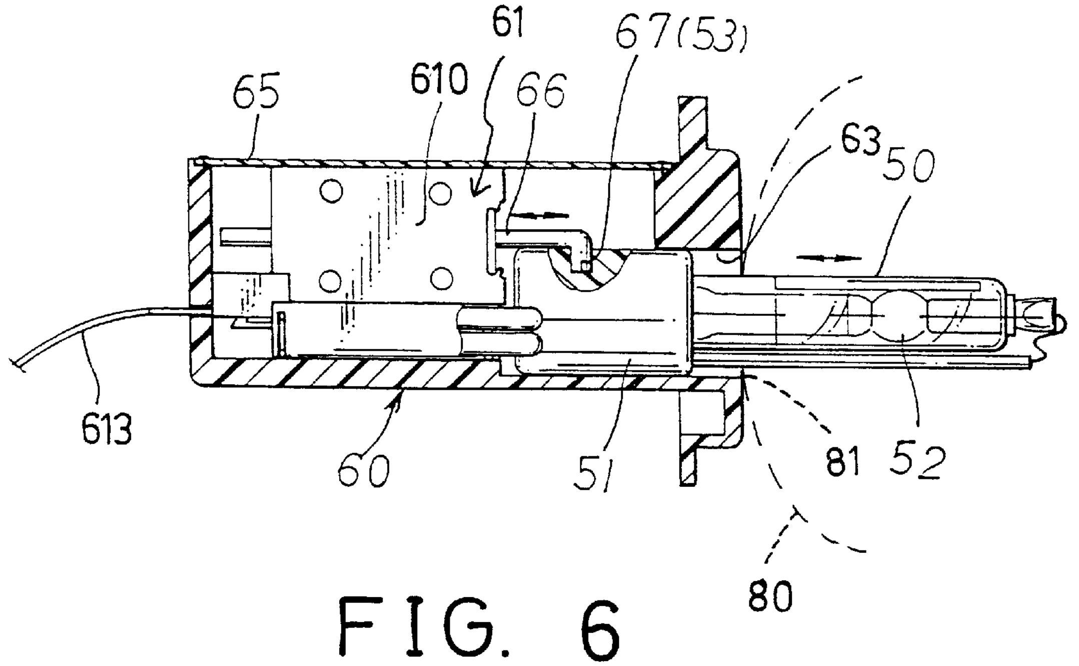
FIG. 6 is a partial cross sectional view similar to FIG. 5, illustrating the operation of the vehicle light.

In operation, as shown in FIGS. 5 and 6, the light bulb 50 and the socket 51 may be moved relative to the housing 60 and the reflector 80 by the solenoid device 61 in order to adjust the light beam of the vehicle, when the iron core 66 is moved relative to the casing 610 by the energizing of the coil 611. The xenon light bulb 50 may generate a light having a light intensity three or more times greater than that of the typical halogen light bulbs.

Accordingly, the vehicle light in accordance with the present invention includes a light beam adjusting device for easily adjusting the light beam of the vehicle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An adjustable vehicle light device for a vehicle, said vehicle light device comprising:

a) a housing for securing to the vehicle, b) a reflector disposed in front of said housing and including a bore formed therein, c) a light bulb slidably engaged through said bore of said reflector, d) a socket for plugging said light bulb, said socket including an aperture formed therein, and e) a solenoid device received in said housing and including:

i) a coil, and ii) a core slidably received in said coil, said core including a hook engaged into said aperture for coupling said socket to said core, and moving said socket and said light relative to said housing and said reflector when said coil is energized, in order to adjust a light beam of the vehicle.

* * * * *